(12) United States Patent
Suthar et al.

(10) Patent No.: US 12,318,722 B2
(45) Date of Patent: Jun. 3, 2025

(54) POROUS PTFE MEMBRANE

(71) Applicant: Donaldson Company, Inc., Minneapolis, MN (US)

(72) Inventors: Anil Suthar, Eden Prairie, MN (US); Richard Brandimarte, Bensalem, PA (US); Robert J. Pannepacker, Jr., Oreland, PA (US); Stuti S. Rajgarhia, Woodbury, MN (US)

(73) Assignee: Donaldson Company, Inc., Bloomington, MN (US)

( * ) Notice: Subject to any disclaimer, the term of this patent is extended or adjusted under 35 U.S.C. 154(b) by 388 days.

(21) Appl. No.: 17/414,908

(22) PCT Filed: Dec. 16, 2019

(86) PCT No.: PCT/US2019/066646
§ 371 (c)(1),
(2) Date: Jun. 16, 2021

(87) PCT Pub. No.: WO2020/131752
PCT Pub. Date: Jun. 25, 2020

(65) Prior Publication Data
US 2022/0062806 A1     Mar. 3, 2022

Related U.S. Application Data

(60) Provisional application No. 62/780,776, filed on Dec. 17, 2018.

(51) Int. Cl.
*B01D 39/16*     (2006.01)
*B01D 69/02*     (2006.01)
*B01D 71/36*     (2006.01)

(52) U.S. Cl.
CPC ......... *B01D 39/1692* (2013.01); *B01D 69/02* (2013.01); *B01D 71/36* (2013.01);
(Continued)

(58) Field of Classification Search
CPC .... B01D 39/1692; B01D 69/02; B01D 71/36; B01D 2239/025; B01D 2239/0618;
(Continued)

(56) References Cited

U.S. PATENT DOCUMENTS

| | | |
|---|---|---|
| 3,315,020 A | 4/1967 | Gore |
| 3,953,566 A | 4/1976 | Gore |

(Continued)

FOREIGN PATENT DOCUMENTS

| | | |
|---|---|---|
| AU | 631008 B2 | 11/1992 |
| EP | 2208615 A1 | 7/2010 |

(Continued)

OTHER PUBLICATIONS

ASTM F316-03, "Standard Test Methods for Pore Size Characteristics of Membrane Filters by Bubble Point and Mean Flow Pore Test", pp. 1312-1319, Apr. 2003 (Year: 2003).*

(Continued)

*Primary Examiner* — Madeline Gonzalez
(74) *Attorney, Agent, or Firm* — Mueting Raasch Group

(57) ABSTRACT

A porous polytetrafluoroethylene (PTFE) membrane including a nonwoven web having a microstructure of substantially only microfibrils fused at crossover points, said membrane having a percent balance of orthogonal dimensions that is within 10%.

20 Claims, 1 Drawing Sheet

(52) U.S. Cl.
CPC ............... *B01D 2239/025* (2013.01); *B01D 2239/0618* (2013.01); *B01D 2239/1216* (2013.01); *B01D 2239/1233* (2013.01); *B01D 2239/1291* (2013.01); *B01D 2325/0281* (2022.08); *B01D 2325/04* (2013.01); *B01D 2325/24* (2013.01)

(58) Field of Classification Search
CPC .... B01D 2239/1216; B01D 2239/1233; B01D 2239/1291; B01D 2325/02; B01D 2325/04; B01D 2325/24; B29C 55/065; B29C 55/085; B29C 55/14; Y02E 60/50; H01M 8/0239
USPC .......... 210/500.36, 507, 503, 505, 490, 491, 210/500.27
See application file for complete search history.

(56) References Cited

U.S. PATENT DOCUMENTS

| | | | |
|---|---|---|---|
| 5,234,739 A | 8/1993 | Tamaru et al. | |
| 5,234,751 A | 8/1993 | Harada et al. | |
| 5,476,589 A * | 12/1995 | Bacino .................. | B29C 55/065 210/507 |
| 5,547,551 A | 8/1996 | Bahar et al. | |
| 5,599,614 A | 2/1997 | Bahar et al. | |
| 5,814,405 A | 9/1998 | Branca et al. | |
| 5,838,406 A | 11/1998 | McGregor et al. | |
| 6,110,333 A | 8/2000 | Spethmann et al. | |
| 7,306,729 B2 | 12/2007 | Bacino et al. | |
| 2010/0323277 A1 | 12/2010 | Roberts | |
| 2017/0001155 A1* | 1/2017 | Chaen ................ | B01D 39/1692 |
| 2022/0062806 A1 | 3/2022 | Suthar et al. | |

FOREIGN PATENT DOCUMENTS

| | | |
|---|---|---|
| JP | 2005-314593 A | 11/2005 |
| JP | 2011-208146 A | 10/2011 |
| JP | 2015-127413 A | 7/2015 |
| JP | 2015-128061 A | 7/2015 |
| JP | 2015-226877 A | 12/2015 |
| JP | 2017-054819 A | 3/2017 |
| WO | 1996028242 A1 | 9/1996 |
| WO | 2003022912 A2 | 3/2003 |
| WO | 2004041529 A1 | 5/2004 |
| WO | 2006066835 A1 | 6/2006 |
| WO | 2007011492 A1 | 1/2007 |
| WO | 2020131752 A1 | 6/2020 |

OTHER PUBLICATIONS

Mehta et al., "Review and analysis of PEM fuel cell design and manufacturing," Journal of Power Sources, 2003, vol. 114, pp. 32-53.

Sopian et al., "Challenges and future developments in proton exchange membrane fuel cells," Renewable Energy, 2006, vol. 31, pp. 719-727.

International Preliminary Report on Patentability in PCT/US2019/066646, mailed Jun. 16, 2021, 9 pages.

International Search Report and Written Opinion in PCT/US2019/066646, mailed Apr. 2, 2020, 13 pages.

"Standard Test Methods for Pore Size Characteristics of Membrane Filters by Bubble Point and Mean Flow Pore Test", published Apr. 2003, ASTM International F316-03, 100 Barr Harbor Drive, PO Box C700, West Conshohocken, PA 19428-2959, pp. 1312-1319.

* cited by examiner

POROUS PTFE MEMBRANE

CROSS-REFERENCE TO RELATED APPLICATIONS

This application is the § 371 U.S. National Stage of International Application No. PCT/US2019/066646, filed 16 Dec. 2019, which claims the benefit of U.S. Provisional Application No. 62/780,776, filed 17 Dec. 2018, the disclosures of which are incorporated by reference herein in their entireties.

BACKGROUND OF THE DISCLOSURE

Porous polytetrafluoroethylene (PTFE) membranes are known that have asymmetric strength (i.e., in the X-Y plane or machine and cross direction) and related properties. For certain applications, such as in fuel cells, membranes with symmetric strength is often desirable.

SUMMARY

The present disclosure provides a porous polytetrafluoroethylene (PTFE) membrane including a nonwoven web having a microstructure of substantially only microfibrils fused at crossover points, said membrane having a percent balance of orthogonal dimensions that is within 10%. Preferably, said membrane has a tensile peak stress (peak force/cross sectional area) in the machine direction and a tensile peak stress in the cross direction, wherein the tensile peak stress in the machine direction is within 10% of the tensile peak stress in the cross direction.

In one embodiment, the present disclosure provides a porous polytetrafluoroethylene membrane including a nonwoven web having a microstructure of substantially only microfibrils fused at crossover points, said membrane having a percent balance of orthogonal dimensions that is within 10% (preferably, said membrane having a tensile peak stress in the machine direction and a tensile peak stress in the cross direction, wherein the tensile peak stress in the machine direction is within 10% of the tensile peak stress in the cross direction); and further wherein the membrane has an IPA flux to pore size value ratio of at least 3, and typically up to 30, for a pore size of 1 micron or lower.

In one embodiment, the present disclosure provides a porous polytetrafluoroethylene membrane comprising a nonwoven web having a microstructure of substantially only microfibrils fused at crossover points, said membrane having a percent balance of orthogonal dimensions that is within 10% (preferably, said membrane having a tensile peak stress in the machine direction and a tensile peak stress in the cross direction, wherein the tensile peak stress in the machine direction is within 10% of the tensile peak stress in the cross direction); and further wherein the membrane has: a thickness of 1 micron to 30 microns; an air flow of 0.5 fpm (0.00254 m/sec) to 10 fpm (0.0508 m/sec); a pore size value of 0.05 micron to 2 microns; a bubble point of 10 psi (68.9 KPa) to 60 psi (413.7 KPa); and an IPA flux to pore size value ratio of 3 to 30 (i.e., 3:1 to 30:1) for a pore size of 1 micron or lower.

In one embodiment, the present disclosure provides a porous polytetrafluoroethylene membrane comprising a nonwoven web having a microstructure of substantially only microfibrils fused at crossover points, said membrane having a percent balance of orthogonal dimensions that is within 10%, or within 5%, or within 1% (preferably, said membrane has a tensile peak stress in the machine direction and a tensile peak stress in the cross direction, wherein the tensile peak stress in the machine direction is within 10%, or within 5%, or within 1%, of the tensile peak stress in the cross direction); and further wherein the membrane has: a thickness of 1 micron to 30 microns; an air flow of 0.5 fpm (0.00254 m/sec) to 10 fpm (0.0508 m/sec); a pore size value of 0.05 micron to 2 microns; a bubble point of 10 psi (68.9 KPa) to 60 psi (413.7 KPa); and an air permeability to bubble point ratio of up to 0.05 (fpm/psi) (0.0037 m/sec/MPa).

Such porous polytetrafluoroethylene membranes can be used in fuel cells and filtration applications, for example, where higher permeability of air and liquid for a given pore size is often a desired characteristic.

The terms "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

As used herein, the term "room temperature" refers to a temperature of 20° C. to 25° C. or 22° C. to 25° C.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list. As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

Herein, "up to" a number (e.g., up to 50) includes the number (e.g., 50).

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present invention. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

Figure 1:
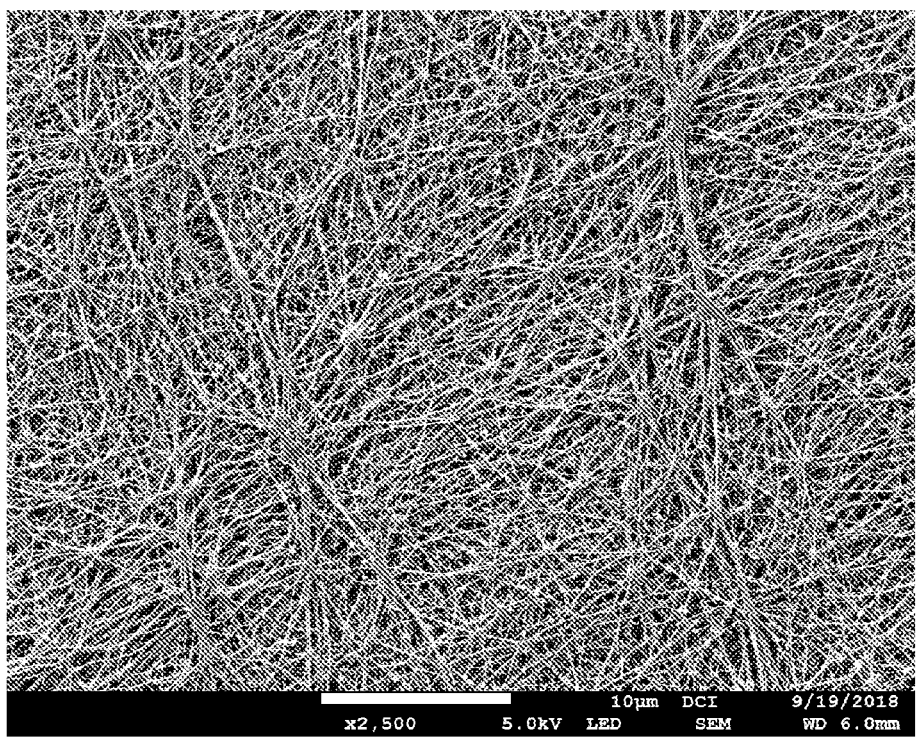
FIG. 1 is an SEM of the membrane of Example 1.

The present disclosure provides a unique porous polytetrafluoroethylene (PTFE) membrane having a microstructure of substantially only microfibrils (i.e., substantially no nodes) and substantially symmetric tensile peak stress (i.e., substantially the same tensile peak stress in the machine direction as in the cross direction). In this context, "substantially only microfibrils" (i.e., substantially no nodes) means that there are less than 100 nodes/100 micron$^2$, and "substantially symmetric" tensile peak stress means that the membrane has a tensile peak stress in the machine direction that is within 10% of the tensile peak stress in the cross direction. If the machine direction and cross direction cannot be identified, a substantially symmetric tensile peak stress means that said membrane has a percent balance of orthogonal dimensions that is within 10%.

More specifically, the present disclosure provides a porous PTFE membrane including a nonwoven web having a microstructure of substantially only microfibrils fused at crossover points, said membrane having a percent balance of orthogonal dimensions within 10%. This means that for a membrane having a tensile peak stress in the machine direction and a tensile peak stress in the cross direction, the tensile peak stress in the machine direction is within 10% of the tensile peak stress in the cross direction.

In certain embodiments, the PTFE membrane has a percent balance of orthogonal dimensions within 5%, or within 1%. That is, the membrane has a tensile peak stress in the machine direction within 5%, or within 1%, of the tensile peak stress in the cross direction.

Peak stress is defined as the peak force over the cross-sectional area of the test specimen. The percentage to determine balance of orthogonal dimensions (Machine Direction ("MD") vs. Cross Direction ("CD" or "CMD")) is calculated as a ratio of the difference in peak stress between the orthogonal dimensions over the machine direction. Alternatively, the balance of orthogonal dimensions (Machine Direction vs. Cross Direction) can be calculated as a ratio of the difference in peak stress between orthogonal dimensions over one of the dimensions (machine direction or cross direction) which has the higher strength of the two orthogonal dimensions.

The following describes the percent balance in equation form.

$$\text{Peak Stress} = \frac{\text{Peak Force}}{\text{Cross section area (thickness} \times \text{width)}}$$

$$\% \text{ Balance} = \frac{\text{Peak Stress}_{CD} - \text{Peak Stress}_{MD}}{\text{Peak Stress}_{MD}} \times 100$$

If the machine direction strength is higher than cross direction, % balance of the strength can alternatively be calculated as:

$$\% \text{ Balance} = \frac{\text{Peak Stress}_{MD} - \text{Peak Stress}_{CD}}{\text{Peak Stress}_{CD}} \times 100$$

The properties of substantially symmetrically strong membranes with substantially no nodes are often desirable in increasing performance of membranes in applications such as fuel cells, filters (e.g., for venting and microfiltration), and semiconductors. For example, a symmetrically strong membrane can improve trans membrane flux by reducing resistance of flow of fluid ions. Similarly, for applications where membranes can be cut into smaller sizes, balanced strength provides dimensional stability under thermal and mechanical stress.

In certain embodiments, the membrane has a tensile peak stress in each of the machine direction and the cross direction of at least 5 MPa, at room temperature. In certain embodiments, the membrane has a tensile peak stress in each of the machine direction and the cross direction of up to 130 MPa, at room temperature. The tensile peak stress can be determined using an EJA series tensile tester (available from Thwing-Albert, West Berlin, NJ) according to ASTM D882-18 (with grips spaced apart at 60 millimeters (mm) at the start of the test; samples cut to 15 mm width and tested for breaking strength at 0.24 inch/minute (6.09 mm/min)).

In certain embodiments, the PTFE membrane has a thickness of at least 1 micron. In certain embodiments, the membrane has a thickness of up to 30 microns, or up to 20 microns, or up to 10 microns.

Typically, when a membrane is made thinner (e.g., by stretching), it loses strength. In certain embodiments of the membranes described herein, if the membrane is made thinner (e.g., by stretching), it increases in strength until it reaches a maximum and then decreases.

In certain embodiments, the PTFE membrane has a pore size value of at least 0.05 micron (i.e., micrometer). In certain embodiments, the membrane has a pore size value of up to 2 microns. Pore size value is the average of the mean pore size of multiple samples of membranes, wherein mean pore size is the average pore size of one membrane sample. Pore size value can be measured using a PMI Advanced Perm Porometer from Porous Materials Inc., Ithaca, NY using the Capillary Flow Procedure preprogrammed in the PMI Advanced Perm Porometer with the following settings: max flow of 100,000 cm$^3$/min; bubble flow of 27.9 cm$^3$/min; and old bubble time F/PT of 50.

In certain embodiments, the PTFE membrane has an air flow of at least 0.5 cubic feet per feet squared per minute (fpm) (0.00254 m/sec). In certain embodiments, the membrane has an air flow of up to 10 fpm (0.0508 m/sec), or up to 5 fpm (0.0254 m/sec). This can be determined using the Air Flow Test described in ASTM D737-18.

Liquids with surface free energies less than that of stretched porous PTFE can be forced out of the structure with the application of a differential pressure. This clearing will occur from the largest passageways first. A passageway is then created through which bulk air flow can take place. The air flow appears as a steady stream of small bubbles through the liquid layer on top of the sample. The pressure at which the first bulk air flow takes place is called the bubble point and is dependent on the surface tension of the test fluid and the size of the largest opening. The bubble point can be used as a relative measure of the structure of a membrane and is often correlated with some other type of performance criteria, such as filtration efficiency.

The bubble point can be measured according to the procedures of ASTM F316-03 (2011). Isopropyl alcohol (IPA) is typically used as the wetting fluid to fill the pores of the test specimen. The bubble point is the pressure of air required to displace the IPA from the largest pores of the test specimen and create the first continuous stream of bubbles detectable by their rise through a layer of IPA covering the porous media. This measurement provides an estimation of maximum pore size.

In certain embodiments, the PTFE membrane has a bubble point of at least 10 psi (68.9 KPa). In certain embodiments, the PTFE membrane has a bubble point of at least 20 psi (137.9 KPa). In certain embodiments, the PTFE membrane has a bubble point of up to 60 psi (413.7 KPa).

In certain embodiments, the PTFE membrane has an IPA flux to pore size value ratio of at least 3:1 for a pore size value of 1 micron or lower. In certain embodiments, the PTFE membrane has an IPA flux to pore size value ratio of up to 30:1 for a pore size of 1 micron or lower. The IPA flux can be determined using volumetric flow rate of 100% IPA through a 42 mm sample at 10 psi (68.9 kPa). The volume of IPA can be collected in a measuring cylinder and time can be calculated for a fixed volume of IPA. For example, time required to flow 100 mL of IPA can be measured on a membrane sample when membrane is subjected to 10 psi (68.9 kPa) of upstream pressure. Pore size value can be measured using a PMI Advanced Perm Porometer from Porous Materials Inc., Ithaca, NY as described above.

In certain embodiments, the microfibrils of the PTFE membrane have an average fiber diameter of at least 5 nanometers (nm), or at least 10 nm. In certain embodiments, the microfibrils have an average fiber diameter of up to 200 nm, or up to 150 nm. This can be determined with SEM.

Thus, in certain embodiments, the PTFE membrane has a tensile peak stress to microfibril diameter of at least 190 MPa/micron. Although there is no upper limit to this, in some embodiments, the PTFE membrane has a tensile peak stress to microfibril diameter of up to 900 MPa/micron.

Thus, in certain embodiments, the PTFE membrane has an air flow (i.e., air permeability) to bubble point ratio of at least 0.008 (fpm/psi) (0.0059 m/sec/MPa). In some embodiments, the PTFE membrane has an air flow to bubble point ratio of up to 0.05 (fpm/psi) (0.0037 m/sec/MPa).

The symmetry of the membrane structure can be created by controlling fibril diameter, internodal distance, and node size of the pre-cursor material.

To manufacture the PTFE membrane, a PTFE raw material typically has a low amorphous content and a degree of crystallization of at least 98% is used as the raw material. The polytetrafluoroethylene used can be in the form of a coagulated dispersion or a fine powder. Suitable commercially available resins include those available under the trade name 601x from Chemours (Wilmington, DE) and F131 from Daikin (Orangeburg, NY).

This PTFE raw material (i.e., resin) is typically then made into a paste by uniformly mixing it with a hydrocarbon extrusion aid such as mineral spirits (e.g., ISOPAR K available from Exxon Mobil), naphtha, or other such lubricant. In certain embodiments, the amount of extrusion aid is typically in an amount of at least 15 weight percent (wt-%), based on the total weight of the paste. In certain embodiments, the amount of extrusion aid is typically in an amount of up to 20 wt-%, based on the total weight of the paste. The final product may include an amount of extrusion aid (e.g., 15.25 wt-%) that is less than the amount added (e.g., 18 wt-%) due to, for example, evaporation.

The paste is then molded into the shape dictated by the intended use of the finished product by a molding method that imparts shear deformation, such as extrusion molding or calender molding. An example of an extrusion die and extrusion molding process that can be used for this initial step is described in U.S. Pat. No. 3,315,020 (Gore) and U.S. Pat. No. 3,953,566 (Gore); however, to create the tape used to produce the membrane described herein, a different stretch differential than what is used in these patents is used (e.g., the Gore stretch differential is 1.4+/−0.3), and a balanced fibrillation tape is not used initially, but the finished product is a balanced membrane.

The paste is usually compressed into a cylinder and molded into the form of a tape (e.g., by ram extrusion), but the shape is not necessarily limited to this, and the article may be molded into a variety of cross-sectional shapes at a temperature of 75° F. to 115° F. (23.9° C. to 46.1° C.), such as a rod or tube, according to the intended use of the finished product.

If desired, two or more layers of tape can be stacked together and calendered between two rolls. This calendering can be carried out multiple times in wet, dry, or a combination of wet and dry form, to achieve a desired thickness. Typically, the desired thickness is 20 mils (508 micrometers) or lower. In certain embodiments, the desired thickness of this intermediate calendered product is at least 11 mils (279 micrometers). The density of this intermediate calendered product (e.g., tape) is typically at least 1.5 grams per cubic centimeter (g/cc), or at least 1.8 g/cc. In certain embodiments, the density of this intermediate calendered product is up to 2.2 g/cc.

The extrusion aid is typically driven off with heat (e.g., at a temperature of 293° F. (145° C.)) after the first or second step of calendering. This intermediate calendered product has a microstructure of microfibrils and nodes.

Typically, the wet intermediate calendered product is not stretched, in contrast to the process described in U.S. Pat. No. 5,476,589 (Bacino).

To form an expanded membrane (ePTFE membrane), the dry intermediate calendered product (e.g., tape) is initially longitudinally stretched in a single step or in multiple steps to a combined stretch sufficiently high to produce an internodal distance of at least 1.5 microns and a fibril diameter of 1 micron or lower. Typically, the combined (i.e., multiplicative) longitudinal stretch (i.e., longitudinal expansion) is at a ratio of 40:1 or less, 30:1 or less, or 20:1 or less. In an example embodiment, the combined longitudinal stretch ratio is 18:1. In some embodiments, the combined longitudinal stretch is at a ratio of at least 6:1. Such values are obtained at a temperature of greater than 400° F. (204.4° C.), and typically up to 665° F. (351.7° C.).

Next, the material, after the longitudinal expansion, is transversely expanded at a ratio sufficiently high to create a fibril diameter of 1 micron or lower. Typically, the transverse stretch (i.e., transverse expansion) is at a ratio of at least 10:1 at a temperature of 500° F. (260° C.) or higher. For example, transverse stretch ratio is 21:1. In some embodiments, the transverse stretch is at a ratio of up to 40:1 at a temperature of 500° F. (260° C.) or higher up to melting temperature of PTFE.

After expansion, in certain embodiments, the membrane is set (i.e., sintered, as described in U.S. Pat. No. 3,953,566 (Gore)) at a temperature of 716° F. (380° C.) or lower. In certain embodiments, the membrane is set at a temperature of at least 617° F. (335° C.).

The resulting membrane has substantially similar tensile peak stress in both directions of at least 19 MPa at a temperature of 72° F. (22° C.).

By this process an open or porous, but strong structure that provides a high air permeable membrane is provided. Despite the presence of numerous pores and despite the thinness, the membrane is unusually strong.

The ePTFE membranes of the present disclosure find many uses, such as in air filters, as a cell diaphragm, a humidifier diaphragm, or a pervaporation diaphragm. They can also be used as a fabric material that is used in applications that require a clean environment.

EXEMPLARY EMBODIMENTS

Embodiment 1 is a porous polytetrafluoroethylene membrane comprising (or consisting essentially of, or consisting of) a nonwoven web having a microstructure of substantially only microfibrils fused at crossover points, said membrane having a percent balance of orthogonal dimensions that is within 10%. Preferably, said membrane has a tensile peak stress in the machine direction and a tensile peak stress in the cross direction, wherein the tensile peak stress in the machine direction is within 10% of the tensile peak stress in the cross direction.

Embodiment 2 is the membrane of embodiment 1 having a percent balance of orthogonal dimensions that is within 5%. Preferably, said membrane has a tensile peak stress in the machine direction within 5% of the tensile peak stress in the cross direction.

Embodiment 3 is the membrane of embodiment 2 having a percent balance of orthogonal dimensions that is within 1%. Preferably, said membrane has a tensile peak stress in the machine direction within 1% of the tensile peak stress in the cross direction.

Embodiment 4 is the membrane of any of the previous embodiments having a tensile peak stress in each of the machine direction and the cross direction of at least 5 MPa at room temperature.

Embodiment 5 is the membrane of any of the previous embodiments having a tensile peak stress in each of the machine direction and the cross direction of up to 130 MPa at room temperature.

Embodiment 6 is the membrane of any of the previous embodiments having a thickness of at least 1 micron.

Embodiment 7 is the membrane of any of the previous embodiments having a thickness of up to 30 microns, up to 20 microns, or up to 10 microns.

Embodiment 8 is the membrane of any of the previous embodiments having a pore size value of at least 0.05 micron.

Embodiment 9 is the membrane of any of the previous embodiments having a pore size value of up to 2 microns.

Embodiment 10 is the membrane of any of the previous embodiments having an air flow of at least 0.5 fpm (0.00254 m/sec).

Embodiment 11 is the membrane of any of the previous embodiments having an air flow of up to 10 fpm (0.0508 m/sec).

Embodiment 12 is the membrane of any of the previous embodiments having a bubble point of at least 10 psi (68.9 KPa), or at least 20 psi (137.9 KPa).

Embodiment 13 is the membrane of any of the previous embodiments having a bubble point of up to 60 psi (413.7 KPa).

Embodiment 14 is the membrane of any of the previous embodiments having an IPA flux to pore size value ratio of at least 3 for a pore size of 1 micron or lower.

Embodiment 15 is the membrane of any of the previous embodiments having an IPA flux to pore size value ratio of up to 30 for a pore size of 1 micron or lower.

Embodiment 16 is the membrane of any of the previous embodiments wherein the microfibrils have an average fiber diameter of at least 5 nm (or at least 10 nm).

Embodiment 17 is the membrane of any of the previous embodiments wherein the microfibrils have an average fiber diameter of up to 200 nm (or up to 150 nm).

Embodiment 18 is a porous polytetrafluoroethylene membrane comprising a nonwoven web having a microstructure of substantially only microfibrils fused at crossover points, said membrane having a percent balance of orthogonal dimensions that is within 10%, or within 5%, or within 1% (preferably, said membrane has a tensile peak stress in the machine direction and a tensile peak stress in the cross direction, wherein the tensile peak stress in the machine direction is within 10%, or within 5%, or within 1%, of the tensile peak stress in the cross direction); and further wherein the membrane has an IPA flux to pore size value ratio of 3 to 30 for a pore size of 1 micron or lower.

Embodiment 19 is the membrane of embodiment 18 having a tensile peak stress in each of the machine direction and the cross direction of at least 5 MPa at room temperature.

Embodiment 20 is the membrane of embodiment 18 or 19 having a tensile peak stress in each of the machine direction and the cross direction of up to 30 MPa at room temperature.

Embodiment 21 is a porous polytetrafluoroethylene membrane comprising a nonwoven web having a microstructure of substantially only microfibrils fused at crossover points, said membrane having a percent balance of orthogonal dimensions that is within 10%, or within 5%, or within 1% (preferably, said membrane has a tensile peak stress in the machine direction and a tensile peak stress in the cross direction, wherein the tensile peak stress in the machine direction is within 10%, or within 5%, or within 1%, of the tensile peak stress in the cross direction); and further wherein the membrane has:

a thickness of 1 micron to 30 microns;
an air flow of 0.5 fpm (0.00254 m/sec) to 10 fpm (0.0508 m/sec);
a pore size value of 0.05 micron to 2 microns;
a bubble point of 10 psi (68.9 KPa) to 60 psi (413.7 KPa); and an IPA flux to pore size value ratio of 3 to 30 for a pore size of 1 micron or lower.

Embodiment 22 is the membrane of any of embodiment 21 which has a tensile peak stress in each of the machine direction and the cross direction of 5 MPa to 130 MPa, at room temperature.

Embodiment 23 is the membrane of any of the previous embodiments which has a tensile peak stress to microfibril diameter of at least 190 MPa/micron.

Embodiment 24 is the membrane of any of the previous embodiments which has an air flow to bubble point ratio of at least 0.008 (fpm/psi) (0.0059 m/sec/MPa).

Embodiment 25 is the membrane of any of the previous embodiments which has an air flow to bubble point ratio of up to 0.05 (fpm/psi) (0.0037 m/sec/MPa).

Embodiment 26 is a porous polytetrafluoroethylene membrane comprising a nonwoven web having a microstructure of substantially only microfibrils fused at crossover points, said membrane having a percent balance of orthogonal dimensions that is within 10%, or within 5%, or within 1% (preferably, said membrane has a tensile peak stress in the machine direction and a tensile peak stress in the cross direction, wherein the tensile peak stress in the machine direction is within 10%, or within 5%, or within 1%, of the tensile peak stress in the cross direction); and further wherein the membrane has:

a thickness of 1 micron to 30 microns;
an air flow of 0.5 fpm (0.00254 m/sec) to 10 fpm (0.0508 m/sec);
a pore size value of 0.05 micron to 2 microns;
a bubble point of 10 psi (68.9 KPa) to 60 psi (413.7 KPa); and
an air permeability to bubble point ratio of up to 0.05 (fpm/psi) (0.0037 m/sec/MPa).

Embodiment 27 is the membrane of any of the previous embodiments which has a thickness of 1 micron to 30 microns, and as the membrane is made thinner, it increases in strength until it reaches a maximum and then decreases.

Embodiment 28 is a fuel cell comprising the porous polytetrafluoroethylene membrane of any of embodiments 1 to 27.

Embodiment 29 is a filter comprising the porous polytetrafluoroethylene membrane of any of embodiments 1 to 27.

Embodiment 30 is a semiconductor comprising the porous polytetrafluoroethylene membrane of any of embodiments 1 to 27.

EXAMPLES

Objects and advantages of this disclosure are further illustrated by the following examples, but the particular materials and amounts thereof recited in these examples, as well as other conditions and details, should not be construed to unduly limit this disclosure.

Example 1

PTFE fine powder (601X, The Chemours Co., Wilmington, DE) was mixed with extrusion aid (Exxon Mobil D-80) at 15.25 wt-% and preformed and ram extruded into a tape with a thickness of 47 mils (1193.8 microns) and a width of 8.75 inches (22.23 cm). The tape was calendered between two steel rolls and later dried to remove lubricant used during the mixing step. The resulting tape had a machine direction tensile stress of approximately 2511 lbf/in$^2$ (psi) (17312 KPa) and a cross machine direction tensile strength of approximately 1506 lbr/in$^2$ (10383 KPa). The dried tape was then stretched longitudinally at a temperature of at 232° C. at a stretch ratio of 9:1 and expanded in the opposite direction at a temperature of 260° C. to 380° C. at a stretch ratio of 21.6. The final membrane produced had a machine direction tensile stress ("MD Peak Stress") of 4429 lbr/in$^2$ (30.53 MPa) and a cross machine direction tensile stress ("CMD Peak Stress") of 4702 lbr/in$^2$ (32.42 MPa). An SEM of the membrane is shown in FIG. 1. Properties such as air perm, bubble point, pore size and IPA flux are listed in Table 1.

Table 2 demonstrates that as the membrane of Example 1 is made thinner, it increases in strength until it reaches a maximum and then decreases. Sample 1=Example 1. Sample 2 was stretched in the MD at a stretch ratio of 12.75 and in the CMD at a stretch ratio of 30.2 compared to Sample 1, which was prepared per the description above. Everything else was kept the same between the two samples. Sample 3 was stretched in the MD at a stretch ratio of 18 and the CMD at a stretch ratio of 38.8 compared to Sample 1.

Example 2

Figure 2:
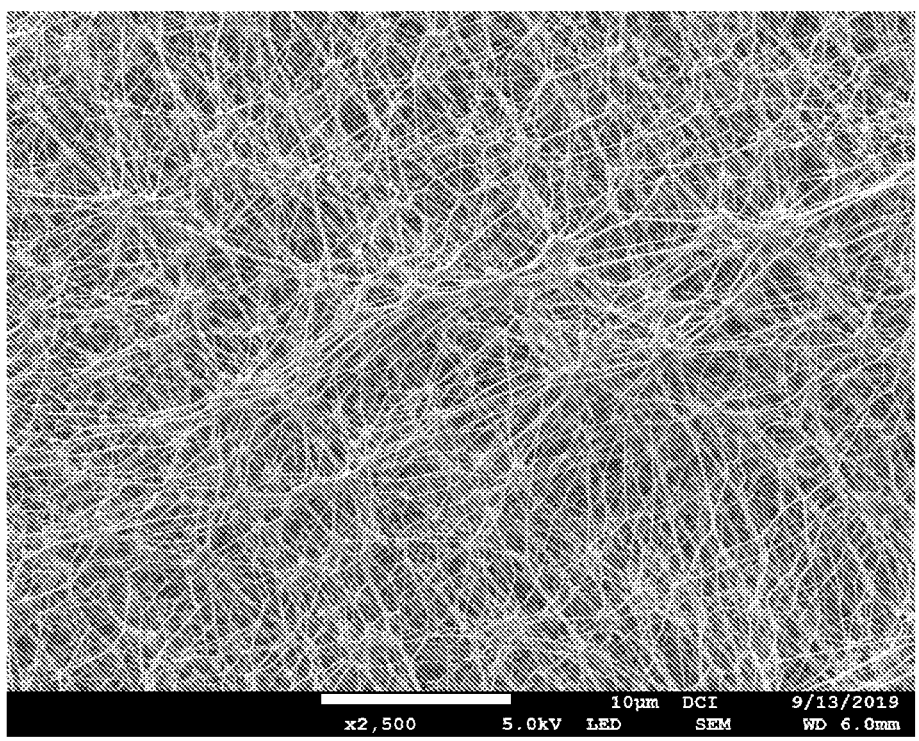
FIG. 2 is an SEM of the membrane of Example 2.

PTFE fine powder (601X Chemours) was mixed with extrusion aid (Exxon Mobil D-80) at 20 wt-% was preformed and ram extruded into a tape with a thickness of 47 mils (1193.8 microns) and a width of 8.5 inches (21.6 cm). The tape was calendered between two steel rolls and later dried to remove lubricant used during the mixing step. The resulting tape had a machine direction tensile stress of approximately 536 lbr/in$^2$ (3.7 MPa) and a cross machine direction tensile strength of approximately 420 lbf/in$^2$ (2.9 MPa). The Dried tape was then stretched longitudinally at a temperature at 260° C. at a stretch ratio of 10.4:1 and expanded in opposite direction at a temperature at 260° C. at a stretch ratio of 10.4. The final membrane produced had a machine direction tensile stress of 2450 lbr/in$^2$ (16.9 MPa) and a cross machine direction tensile stress of 2234 lbf/in$^2$ (15.4 MPa). An SEM of the membrane is shown in FIG. 2. Properties of the membrane are listed in Table 1.

TABLE 1

| Example | MD Peak Stress | CMD Peak Stress | Air Perm (i.e., Air Flow) | Bubble Point | IPA Flux | Pore Size | IPA to Pore Size Ratio |
|---|---|---|---|---|---|---|---|
| 1 | 30.53 MPa | 32.42 MPa | 0.694 fpm (0.00352 m/sec) | 38 psi (262 KPa) | 33 mL/ min · cm$^2$ · psi | 0.16 micron | 8.19 |

TABLE 1-continued

| Example | MD Peak Stress | CMD Peak Stress | Air Perm (i.e., Air Flow) | Bubble Point | IPA Flux | Pore Size | IPA to Pore Size Ratio |
|---|---|---|---|---|---|---|---|
| 2 | 16.9 MPa | 15.4 MPa | 0.95 fpm (0.0048 m/sec) | 12.6 psi (86.6 KPa) | 1.06 mL/min · cm² · psi | 0.29 micron | 3.6 |

TABLE 2

| | Thickness | Machine Direction Peak Stress | Cross Direction Peak Stress |
|---|---|---|---|
| Sample 1 | 7.8 microns | 30.53 MPa | 32.42 MPa |
| Sample 2 | 3.8 microns | 78.06 MPa | 79.46 MPa |
| Sample 3 | 3.04 microns | 52.20 MPa | 56.29 MPa |

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The invention claimed is:

1. A porous polytetrafluoroethylene membrane consisting of polytetrafluoroethylene, the porous polytetrafluoroethylene membrane being a nonwoven web having a microstructure of microfibrils fused at crossover points with less than 100 nodes per 100 µm², said membrane having a tensile peak stress in a machine direction and a tensile peak stress in a cross direction, wherein the tensile peak stress in the machine direction is within 10% of the tensile peak stress in the cross direction, and wherein the tensile peak stress in the machine direction and the tensile peak stress in the cross direction is up to 130 MPa at room temperature.

2. The membrane of claim 1 having a tensile peak stress in each of the machine direction and the cross direction of at least 5 MPa.

3. The membrane of claim 1 having a pore size value of 0.05 micron to 2 microns.

4. The membrane of claim 1 having an air flow of 0.5 fpm (0.00254 m/sec) to 10 fpm (0.0508 m/sec).

5. The membrane of claim 1 having a bubble point of 10 psi (68.9 KPa) to 60 psi (413.7 KPa).

6. The membrane of claim 1 having an IPA flux to pore size value ratio of 3 to 30 for a pore size of 1 micron or lower.

7. The membrane of claim 1 wherein the microfibrils have an average fiber diameter of 5 nm to 200 nm.

8. The porous polytetrafluoroethylene membrane of claim 1, wherein the membrane has an IPA flux to pore size value ratio of 3 to 30 for a pore size of 1 micron or lower, and wherein the membrane has a thickness of 1 micron to 30 microns.

9. The porous polytetrafluoroethylene membrane of claim 1, wherein the membrane has:
a thickness of 1 micron to 30 microns;
an air flow of 0.5 fpm (0.00254 m/sec) to 10 fpm (0.0508 m/sec);
a pore size value of 0.05 micron to 2 microns;
a bubble point of 10 psi (68.9 KPa) to 60 psi (413.7 KPa);
an IPA flux to pore size value ratio of 3 to 30 for a pore size of 1 micron or lower.

10. The porous polytetrafluoroethylene membrane of claim 1, wherein the membrane has:
a thickness of 1 micron to 30 microns;
an air flow of 0.5 fpm (0.00254 m/sec) to 10 fpm (0.0508 m/sec);
a pore size value of 0.05 micron to 2 microns;
a bubble point of 10 psi (68.9 KPa) to 60 psi (413.7 KPa);
an air permeability to bubble point ratio of up to 0.05 (fpm/psi) (0.037 m/s/MPa); and
wherein as the membrane is made thinner, it increases in strength until it reaches a maximum and then decreases.

11. A fuel cell comprising the porous polytetrafluoroethylene membrane of claim 1.

12. The membrane of claim 1, wherein the membrane has a tensile peak stress in a machine direction and a tensile peak stress in a cross direction, wherein the tensile peak stress in the machine direction is within 5% of the tensile peak stress in the cross direction.

13. A porous polytetrafluoroethylene membrane consisting of polytetrafluoroethylene, the porous polytetrafluoroethylene membrane being a nonwoven web having a microstructure of microfibrils fused at crossover points with less than 100 nodes per 100 µm², the membrane having a tensile peak stress in a machine direction and a tensile peak stress in a cross direction, wherein the tensile peak stress in the machine direction is within 10% of the tensile peak stress in the cross direction, and wherein the membrane has a thickness of 1 micrometer to 3.8 micrometers.

14. The membrane of claim 13, wherein the membrane has a tensile peak stress in a machine direction and a tensile peak stress in a cross direction, wherein the tensile peak stress in the machine direction is within 5% of the tensile peak stress in the cross direction.

15. A fuel cell comprising the membrane of claim 13.

16. A porous polytetrafluoroethylene membrane consisting of polytetrafluoroethylene, the porous polytetrafluoroethylene membrane being a nonwoven web having a microstructure of microfibrils fused at crossover points with less than 100 nodes per 100 µm², the membrane having a tensile peak stress in a machine direction and a tensile peak stress in a cross direction, wherein the tensile peak stress in the machine direction is within 10% of the tensile peak stress in the cross direction, and wherein the membrane has a thickness of 7.8 micrometer to 10 micrometers.

17. The membrane of claim 16, wherein the membrane has a tensile peak stress in a machine direction and a tensile peak stress in a cross direction, wherein the tensile peak stress in the machine direction is within 5% of the tensile peak stress in the cross direction.

18. A fuel cell comprising the membrane of claim 16.

19. A porous polytetrafluoroethylene membrane consisting of polytetrafluoroethylene, the porous polytetrafluoroethylene membrane being a nonwoven web having a microstructure of microfibrils fused at crossover points with less than 100 nodes per 100 $\mu m^2$, the membrane having a tensile peak stress in a machine direction and a tensile peak stress in a cross direction, wherein the tensile peak stress in the machine direction is within 5% of the tensile peak stress in the cross direction.

20. A fuel cell comprising the membrane of claim 19.

* * * * *